(12) United States Patent
Abrishamkar et al.

(10) Patent No.: US 8,619,928 B2
(45) Date of Patent: Dec. 31, 2013

(54) MULTI-STAGE INTERFERENCE SUPPRESSION

(75) Inventors: Farrokh Abrishamkar, San Diego, CA (US); Divaydeep Sikri, Farnborough (GB); Raghu N. Challa, San Diego, CA (US); Bahadir Canpolat, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 899 days.

(21) Appl. No.: 12/553,848

(22) Filed: Sep. 3, 2009

(65) Prior Publication Data

US 2011/0051864 A1    Mar. 3, 2011

(51) Int. Cl.
    *H04B 1/10*    (2006.01)
(52) U.S. Cl.
    USPC .......................................................... 375/350
(58) Field of Classification Search
    USPC .......................................................... 375/350
    See application file for complete search history.

(56) References Cited

U.S. PATENT DOCUMENTS

| | | | |
|---|---|---|---|
| 5,267,249 A | 11/1993 | Dong | |
| 5,887,035 A | 3/1999 | Molnar | |
| 6,259,730 B1 | 7/2001 | Solondz | |
| 6,480,558 B1 | 11/2002 | Ottosson et al. | |
| 6,587,522 B1 | 7/2003 | Wheeler et al. | |
| 6,615,030 B1 | 9/2003 | Saito et al. | |
| 6,628,707 B2 | 9/2003 | Rafie et al. | |
| 6,765,894 B1 | 7/2004 | Hayashi | |
| 6,771,689 B2 | 8/2004 | Solondz | |
| 6,834,197 B2 | 12/2004 | Nakahara et al. | |
| 6,907,092 B1 | 6/2005 | Yakhnich et al. | |
| 6,931,030 B1 | 8/2005 | Dogan | |

(Continued)

FOREIGN PATENT DOCUMENTS

| | | |
|---|---|---|
| CN | 1207835 A | 2/1999 |
| CN | 1736101 A | 2/2006 |

(Continued)

OTHER PUBLICATIONS

3GPP Draft; 25.814-V1.5.0, 3rd Generation Partnership Project (3GPP), Mobile Competence Centre ; 650, Route Des Lucioles ; F-06921 Sophia-Antipolis Cedex ; France, vol. RAN WG1, No. Shanghai, China; May 26, 2006, XP050102001 pp. 29-30 p. 76 pp. 89-90.

(Continued)

*Primary Examiner* — Siu Lee
*Assistant Examiner* — Tanmay Shah
(74) *Attorney, Agent, or Firm* — S. Hossain Beladi

(57) ABSTRACT

A multi-stage interference suppression receiver includes a short equalizer section configured to operate on a first portion of a received signal received over a channel to produce a first equalized signal and a first estimate of the channel, a channel estimator section configured to operate on the first equalized signal to produce a second equalized signal, the channel estimator section comprising a linear estimator and a non-linear estimator, a long equalizer section configured to operate on a second portion of the received signal to produce a first estimate of symbols in the received signal and a second estimate of the channel and an interference canceller section configured to operate on the first estimate of symbols in the received signal to generate a second estimate of symbols in the received signal based on, at least in part, the second estimate of the channel.

60 Claims, 11 Drawing Sheets

(56) References Cited

U.S. PATENT DOCUMENTS

| | | |
|---|---|---|
| 6,959,010 B1 | 10/2005 | Bahrenburg et al. |
| 6,985,516 B1 | 1/2006 | Easton et al. |
| 7,013,147 B1 | 3/2006 | Kuwahara et al. |
| 7,107,031 B2 | 9/2006 | Kristensson et al. |
| 7,116,735 B2 | 10/2006 | Yamada et al. |
| 7,187,736 B2 | 3/2007 | Buckley et al. |
| 7,200,172 B2 | 4/2007 | Pukkila et al. |
| 7,295,636 B2 | 11/2007 | Onggosanusi et al. |
| 7,298,806 B1 | 11/2007 | Varma et al. |
| 7,308,056 B2 | 12/2007 | Pukkila et al. |
| 7,313,189 B2 | 12/2007 | Yoshida et al. |
| 7,620,662 B2 * | 11/2009 | Kassai et al. ................. 1/1 |
| 7,693,210 B2 | 4/2010 | Margetts et al. |
| 7,706,430 B2 | 4/2010 | Guo et al. |
| 7,764,726 B2 | 7/2010 | Simic et al. |
| 7,933,256 B2 | 4/2011 | Abrishamkar et al. |
| 8,422,955 B2 | 4/2013 | Smee et al. |
| 2002/0132625 A1 | 9/2002 | Ogino et al. |
| 2002/0181557 A1 | 12/2002 | Fujii |
| 2003/0112370 A1 | 6/2003 | Long et al. |
| 2003/0119451 A1 | 6/2003 | Jang et al. |
| 2003/0147476 A1 | 8/2003 | Ma et al. |
| 2004/0001563 A1 * | 1/2004 | Scarpa ................. 375/326 |
| 2004/0017311 A1 | 1/2004 | Thomas et al. |
| 2004/0043746 A1 | 3/2004 | Hiramatsu |
| 2004/0062302 A1 | 4/2004 | Fujii et al. |
| 2004/0081248 A1 | 4/2004 | Parolari |
| 2004/0116122 A1 | 6/2004 | Zeira et al. |
| 2004/0203913 A1 | 10/2004 | Ogino et al. |
| 2004/0223538 A1 | 11/2004 | Zeira |
| 2005/0084045 A1 | 4/2005 | Stewart et al. |
| 2005/0111408 A1 | 5/2005 | Skillermark et al. |
| 2005/0147024 A1 | 7/2005 | Jung et al. |
| 2005/0153695 A1 | 7/2005 | Cho |
| 2005/0232174 A1 | 10/2005 | Onggosanusi et al. |
| 2005/0265465 A1 | 12/2005 | Hosur et al. |
| 2005/0277429 A1 | 12/2005 | Laroia et al. |
| 2006/0109938 A1 | 5/2006 | Challa et al. |
| 2006/0126765 A1 | 6/2006 | Shin et al. |
| 2006/0146953 A1 | 7/2006 | Raghothaman et al. |
| 2006/0146969 A1 | 7/2006 | Zhang et al. |
| 2006/0203943 A1 | 9/2006 | Scheim et al. |
| 2006/0209982 A1 * | 9/2006 | De Gaudenzi et al. ....... 375/279 |
| 2006/0227853 A1 | 10/2006 | Liang et al. |
| 2006/0234715 A1 | 10/2006 | Cho et al. |
| 2007/0058709 A1 | 3/2007 | Chen et al. |
| 2007/0063897 A1 | 3/2007 | Matsuda |
| 2007/0071145 A1 | 3/2007 | Perets |
| 2007/0121764 A1 | 5/2007 | Chen et al. |
| 2007/0127608 A1 | 6/2007 | Scheim et al. |
| 2007/0183483 A1 | 8/2007 | Narayan et al. |
| 2007/0201548 A1 | 8/2007 | Badri-Hoeher et al. |
| 2007/0273698 A1 | 11/2007 | Du et al. |
| 2008/0019467 A1 | 1/2008 | He |
| 2008/0031368 A1 | 2/2008 | Lindoff et al. |
| 2008/0125070 A1 | 5/2008 | Grieco et al. |
| 2008/0212462 A1 | 9/2008 | Ahn et al. |
| 2008/0227456 A1 | 9/2008 | Huang et al. |
| 2008/0232439 A1 | 9/2008 | Chen |
| 2008/0298521 A1 | 12/2008 | Wu |
| 2008/0298524 A1 | 12/2008 | Koorapaty et al. |
| 2009/0052591 A1 | 2/2009 | Chen |
| 2009/0058728 A1 | 3/2009 | Mostafa et al. |
| 2009/0092178 A1 | 4/2009 | Sayana et al. |
| 2009/0207944 A1 | 8/2009 | Furman et al. |
| 2010/0027702 A1 * | 2/2010 | Vijayan et al. ................. 375/267 |
| 2010/0029213 A1 | 2/2010 | Wang |
| 2010/0029262 A1 | 2/2010 | Wang et al. |
| 2010/0040035 A1 | 2/2010 | Shapiro et al. |
| 2010/0046595 A1 | 2/2010 | Sikri et al. |
| 2010/0046660 A1 | 2/2010 | Sikri et al. |
| 2010/0046682 A1 | 2/2010 | Sikri et al. |
| 2010/0054212 A1 | 3/2010 | Tang |
| 2010/0202544 A1 * | 8/2010 | Osseirar et al. ................. 375/260 |
| 2010/0248666 A1 | 9/2010 | Hui et al. |
| 2010/0278227 A1 | 11/2010 | Sikri et al. |
| 2010/0296556 A1 * | 11/2010 | Rave et al. ................. 375/219 |
| 2010/0310026 A1 | 12/2010 | Sikri et al. |
| 2011/0051859 A1 | 3/2011 | Canpolat et al. |
| 2011/0305303 A1 | 12/2011 | Sikri et al. |
| 2011/0312275 A1 | 12/2011 | Canpolat et al. |

FOREIGN PATENT DOCUMENTS

| | | |
|---|---|---|
| CN | 1906862 A | 1/2007 |
| EP | 0396403 A1 | 11/1990 |
| EP | 0969608 A2 | 1/2000 |
| EP | 1347611 A1 | 9/2003 |
| EP | 1404047 A2 | 3/2004 |
| EP | 1411693 A2 | 4/2004 |
| EP | 1569399 A1 | 8/2005 |
| EP | 1681775 A2 | 7/2006 |
| EP | 1699194 A1 | 9/2006 |
| EP | 1699195 A1 | 9/2006 |
| EP | 1928138 A2 | 6/2008 |
| JP | 2000059290 A | 2/2000 |
| JP | 2000261397 A | 9/2000 |
| JP | 2001166026 A | 6/2001 |
| JP | 2001512916 A | 8/2001 |
| JP | 3210915 B2 | 9/2001 |
| JP | 2001257626 A | 9/2001 |
| JP | 2001267987 A | 9/2001 |
| JP | 2002507342 A | 3/2002 |
| JP | 2002508129 A | 3/2002 |
| JP | 2002539711 A | 11/2002 |
| JP | 2003051762 A | 2/2003 |
| JP | 2003152603 A | 5/2003 |
| JP | 2003338779 A | 11/2003 |
| JP | 2004048307 A | 2/2004 |
| JP | 2004112094 A | 4/2004 |
| JP | 2004511189 A | 4/2004 |
| JP | 2004159277 A | 6/2004 |
| JP | 2004166218 A | 6/2004 |
| JP | 2005065197 A | 3/2005 |
| JP | 2005510940 A | 4/2005 |
| JP | 2006503485 A | 1/2006 |
| JP | 2006191587 A | 7/2006 |
| JP | 2008278338 A | 11/2008 |
| JP | 2009545219 A | 12/2009 |
| JP | 2011524115 A | 8/2011 |
| KR | 20010085143 A | 9/2001 |
| KR | 1020050097552 A | 10/2005 |
| RU | 2211531 C2 | 8/2003 |
| RU | 2233033 C2 | 7/2004 |
| RU | 2280329 C1 | 7/2006 |
| RU | 2301493 | 6/2007 |
| RU | 2319307 C2 | 3/2008 |
| TW | 365717 | 8/1999 |
| TW | 200640202 | 11/2006 |
| WO | 9857509 A2 | 12/1998 |
| WO | 9901950 A2 | 1/1999 |
| WO | 9912273 | 3/1999 |
| WO | 00035117 | 6/2000 |
| WO | 0055992 A1 | 9/2000 |
| WO | 0232003 A1 | 4/2002 |
| WO | 02067444 A1 | 8/2002 |
| WO | 03047124 A1 | 6/2003 |
| WO | 2004010573 A1 | 1/2004 |
| WO | 2004066666 | 8/2004 |
| WO | 2004107768 A2 | 12/2004 |
| WO | 2005053177 A1 | 6/2005 |
| WO | 2007000620 A1 | 1/2007 |
| WO | 2007029958 A1 | 3/2007 |
| WO | 2007060093 A1 | 5/2007 |
| WO | 2007060229 A1 | 5/2007 |
| WO | 2008012265 A1 | 1/2008 |
| WO | 2009108586 A2 | 9/2009 |
| WO | 2009140338 A2 | 11/2009 |

OTHER PUBLICATIONS

Huaiyu, D. et al., "Asymptotic spectral efficiency of multi cell MIMO systems with frequency-flat fading," IEEE Transactions on Signal Processing, IEEE Service Center, New York, NY, US, vol. 51, No. 11, Nov. 1, 2003, pp. 2976-2988, XP011102811.

(56) References Cited

OTHER PUBLICATIONS

International Search Report and Written Opinion—PCT/US2010/047775, International Search Authority—European Patent Office—Mar. 8, 2011.

Meyr, H. et al., "Chapter 5: Synthesis of Synchronization Algorithms" and "Chapter 8: Frequency Estimation," Jan. 1, 1998, Digital Communication Receivers:Synchronization,Channel Estimation, and Signal Processing; John Wiley and Sons, Inc.: New York, pp. 271-323,445, XP002547568.

Natali F.D., "AFC Tracking Algorithms" IEEE Transactions on Communications, IEEE Service Center, Piscataway, NJ, US, vol. COM-32, No. 8, Aug. 1, 1984, pp. 935-947, XP000758571 ISSN: 0090-6778 abstract p. 941, section C.

Olivier J.C., et al., "Single antenna interference cancellation for synchronised GSM networks using a widely linear receiver" (Feb. 1, 2007) pp. 131-136, XP006028092.

Pais, A.V., et al., "Indoor DS-CDMA system deployment and performance with successive interference cancellation," Electronics Letters: GB, vol. 40, No. 19, Sep. 16, 2004, pp. 1200-1201, XP006022654.

Ritt: "Performance of IDMA-based inter-cell interference cancellation," 3GPP Draft TSG-RAN WG1 #44-bis Meeting, R1-060895, 3rd Generation Partnership Project (3GPP), Athens, Greece; Mar. 27, 2006, XP050101801, pp. 1-5.

Sawahashi M., et al., "Multipath Interference Canceller for Orthogonal Multiplexed Channel and its Performance in W-CDMA Forward Link," Technical Report of the Institute of Electronics, Information and Communication Engineers, Jan. 12, 2001, vol. 100, No. 558, pp. 27-33, RCS2000-195.

Chunguang, W., et al., "Enhanced OTDOA Technology in 3G Location Service", Shanghai Research Institute of China Telecom, Shanghai 200122, China, Aug. 31, 2005.

Xiaofa, L., "The study of Interference Cancellation based on Multi-User Detection", Chinese Scientific Papers Online, pp. 7, Mar. 27, 2008.

\* cited by examiner

MULTI-STAGE INTERFERENCE SUPPRESSION

REFERENCE TO CO-PENDING APPLICATIONS FOR PATENT

The present application for patent is related to co-pending U.S. patent application Ser. No. 12/038,724, entitled "COHERENT SINGLE ANTENNA INTERFERENCE CANCELLATION FOR GSM/GPRS/EDGE," filed Feb. 27, 2008, assigned to the assignee hereof, and expressly incorporated by reference herein.

The present application for patent is related to co-pending U.S. patent application Ser. No. 12/464,311, entitled "TWO DIMENSIONAL SEARCH FOR GERAN: OPTIMAL TIMING AND CARRIER RECOVERY," filed May 12, 2009, assigned to the assignee hereof, and expressly incorporated by reference herein.

The present application for patent is related to co-pending U.S. patent application Ser. No. 12/193,995, entitled "ENHANCED GERAN RECEIVER USING CHANNEL INPUT BEAMFORMING," filed Aug. 19, 2008, assigned to the assignee hereof, and expressly incorporated by reference herein.

The present application for patent is related to co-pending U.S. patent application Ser. No. 12/478,195, entitled "ITERATIVE INTERFERENCE CANCELLATION RECEIVER," filed Jun. 4, 2009, assigned to the assignee hereof, and expressly incorporated by reference herein.

The present application for patent is related to co-pending U.S. patent application Ser. No. 12/553,855, entitled "SYMBOL ESTIMATION METHODS AND APPARATUSES," filed Sep. 3, 2009, assigned to the assignee hereof, and expressly incorporated by reference herein.

BACKGROUND

1. Field

The present invention relates to wireless communication and, in particular, relates to interference cancellation at a receiver.

2. Background

In many communication systems utilizing GSM, GPRS, EDGE or the like, a receiver's ability to properly decode a received signal depends upon the receiver's ability to effectively suppress co-channel interference (CCI) and inter-symbol interference (ISI). As wireless communications become ever more prevalent, however, increasing amounts of CCI and ISI can negatively affect a receiver's ability to suppress interference.

SUMMARY

In one aspect, a communication receiver comprising a short equalizer section, a channel estimator section, a long equalizer section and an interference canceller section is disclosed. The short equalizer section is configured to operate on a first portion of a received signal received over a channel to produce a first equalized signal and a first estimate of the channel. The channel estimator section configured to operate on the first equalized signal to produce a second equalized signal, the channel estimator section comprising a linear estimator and a non-linear estimator. The long equalizer section is configured to operate on a second portion of the received signal to produce a first estimate of symbols in the received signal and a second estimate of the channel. The interference canceller section is configured to operate on the first estimate of symbols in the received signal to generate a second estimate of symbols in the received signal based on, at least in part, the second estimate of the channel.

In another aspect, a signal reception method is disclosed. The method comprises producing a first equalized signal and a first estimate of a channel by operating on a first portion of a received signal received over the channel, producing a second equalized signal using the first equalized signal and one of a linear estimator and a non-linear estimator, estimating a first estimate of symbols in the received signal and a second estimate of the channel from a second portion of the received signal, and generating a second estimate of symbols in the received signal based on the second estimate of the channel.

In yet another aspect, a machine-readable medium comprising instructions for receiving a signal at a receiver is disclosed. The instructions comprise code for producing a first equalized signal and a first estimate of a channel by operating on a first portion of a received signal received over the channel, code for producing a second equalized signal using the first equalized signal and one of a linear estimator and a non-linear estimator, code for estimating a first estimate of symbols in the received signal and a second estimate of the channel from a second portion of the received signal, and code for generating a second estimate of symbols in the received signal based on the second estimate of the channel.

In yet another aspect, a signal reception apparatus comprising means for producing a first equalized signal and a first estimate of a channel by operating on a first portion of a received signal received over the channel, means for producing a second equalized signal using the first equalized signal and one of a linear estimator and a non-linear estimator, means for estimating a first estimate of symbols in the received signal and a second estimate of the channel from a second portion of the received signal, and means for generating a second estimate of symbols in the received signal based on the second estimate of the channel is disclosed.

In yet another aspect, a communication device comprising a memory and a processor is disclosed. The processor is configured to execute instructions to produce a first equalized signal and a first estimate of a channel by operating on a first portion of a received signal received over the channel, produce a second equalized signal using the first equalized signal and one of a linear estimator and a non-linear estimator, estimate a first estimate of symbols in the received signal and a second estimate of the channel from a second portion of the received signal, and generate a second estimate of symbols in the received signal based on the second estimate of the channel.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
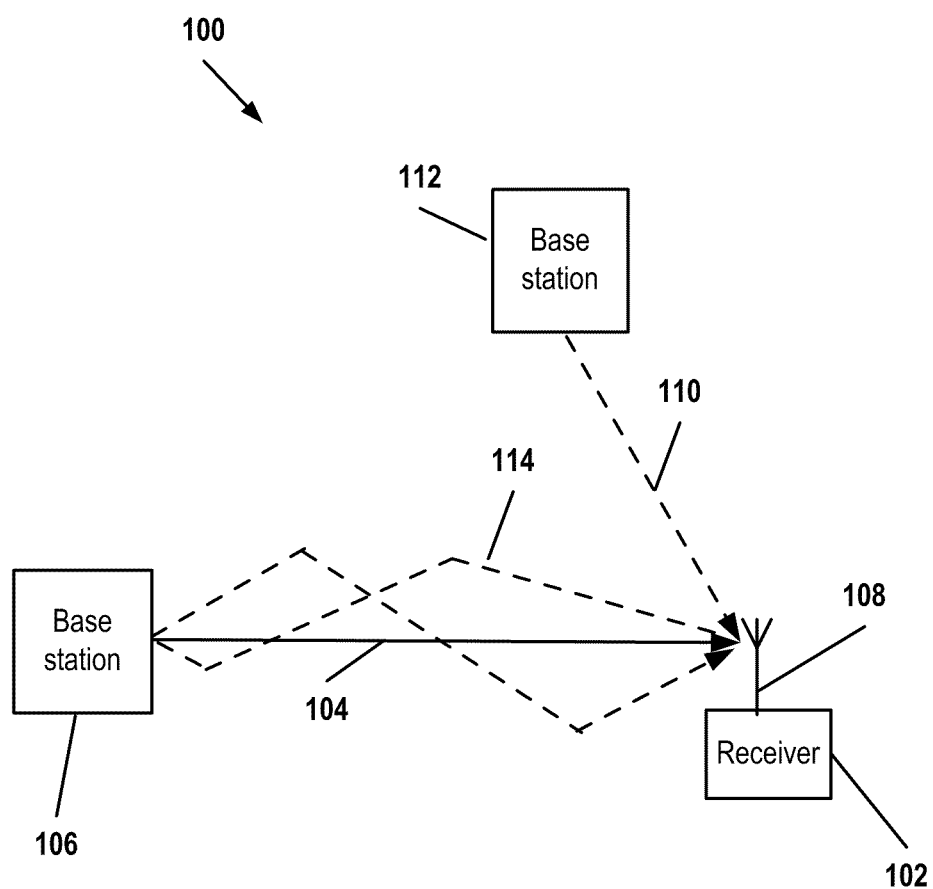
FIG. 1 illustrates an exemplary communication system in accordance with certain configurations of the present disclosure.

Receivers operating in accordance with certain wireless standards, such as GERAN, often receive signals over a channel that may be characterized as a fading channel. Operation of a receiver often involves receiving a signal, extracting symbols from the received signal and demodulating the symbols to produce data bits. To help produce the data bits accurately, a receiver may also suppress (or remove) signal distortions caused by the communication channel, noise, interference from unwanted transmitters, and so on. Receivers are often designed by making assumptions about communication channels (e.g., assuming that a communication channel has a finite impulse response of a certain duration) and noise signal (e.g., assuming that noise has a white spectrum). Based on the assumptions made, a practitioner of the art may configure a receiver to suppress the signal distortions by performing channel equalization using, for example, maximum likelihood (ML) detection, decision feedback equalization (DFE), minimum least squares estimate (MLSE) and other well-known algorithms. While algorithms such as the MLSE may provide optimal results in many applications, MLSE tends to be computationally expensive, making it an unattractive option for implementation at a resource-limited wireless device. Furthermore, computational complexity of the MLSE algorithm increases non-linearly with increasing constellation density of the received signals. Therefore, in communications network that use higher order modulation schemes (e.g., 8PSK), a channel equalization and/or an interference suppression technique that is computationally less expensive than MLSE is desirable.

Channel equalization techniques using MLSE are generally called "non-linear" channel equalization techniques in the art. Other techniques such as channel equalization using a liner combiner are generally called "linear" channel equalization techniques. Broadly speaking, MLSE algorithm works better than other techniques when some information is available about a channel and/or received signal amplitude distortion is severe. In certain aspects, configurations of the present disclosure provide methods and systems wherein channel equalization and interference suppression may be performed using either a non-linear technique such as MLSE or a linear technique such as a linear combiner, based on certain operational conditions of the receiver. These operational conditions include, for example, constellation density of the received signal and severity of distortion in the received signal. In one aspect, such architecture is advantageous for a receiver expected to receive signals with different modulation schemes in the same network. For example, the GERAN Evolution standard uses modulation schemes including GMSK, QPSK, 8PSK, 16-QAM and 32-QAM.

Broadly and generally speaking, in certain aspects, the present disclosure provides signal reception techniques wherein a receiver is operationally optimal in the sense of minimizing probability of error. In one aspect, a receiver suppresses interference blindly. In another aspect, a receiver uses signal processing techniques having relatively low complexity. In another aspect, a receiver is robust to frequency differential between a desired signal and interference. In certain aspects, the present disclosure provides signal reception techniques applicable to a multi-input multi-output (MIMO) channel. In certain configuration, a MIMO channel is characterized by having multiple receive antennas at a receiver configured to receive signals from multiple transmit antennas at a transmitter.

The following abbreviations are used throughout the disclosure.
CCI=co-channel interference
EDGE=enhanced data rate for GSM evolution
eSAIC=enhanced single antenna interference cancellation
FER=frame error rate
GERAN=GSM EDGE radio access network
GP=guard period
GSM=Global Standard for Mobile communication (Groupe Mobil Special)
IC=interference cancellation/canceller
ISI=inter-symbol interference
LLR=log-likelihood ratio
MDD=minimum distance detector
MEQ=multiple stream equalizer
MIMO=Multiple input multiple output
ML=maximum likelihood
MLSE=maximum likelihood sequence estimator
MMSE=minimum mean squared error
MSIC=multiple stream inter-symbol interference cancellation
PHIC=parallel hierarchical interference cancellation
PSK=phase shift keying
RLS=recursive least squares
RSSE=Reduced state sequence estimation
SER=symbol error rate
SNR=signal to noise ratio
TDMA=time domain multiple access FIG. 1 illustrates a communication system 100 in accordance with one aspect of the subject technology. The communication system 100 may, for example, be a wireless communication system based on the GSM standard. A receiver 102 receives a signal 104 transmitted by a base station 106 at an antenna 108 coupled to the receiver 102. However, as illustrated, the signal 104 may suffer from impediments such as co-channel interference (CCI), including a transmission 110 from another base station 112, and inter-symbol interference (ISI) comprising one or more reflections 114 of the signal 104. Accordingly, in certain aspects, the receiver 102 processes the signal 104 to suppress effects of CCI and ISI and recover the data transmitted by the base station 106 by estimating received symbols. While FIG. 1 depicts a single antenna 108 for the sake of clarity, it is contemplated that configurations of the present disclosure also include MIMO transmission systems and the receiver 102 may have multiple receive antennas to receive the signal 104.

Figure 2:
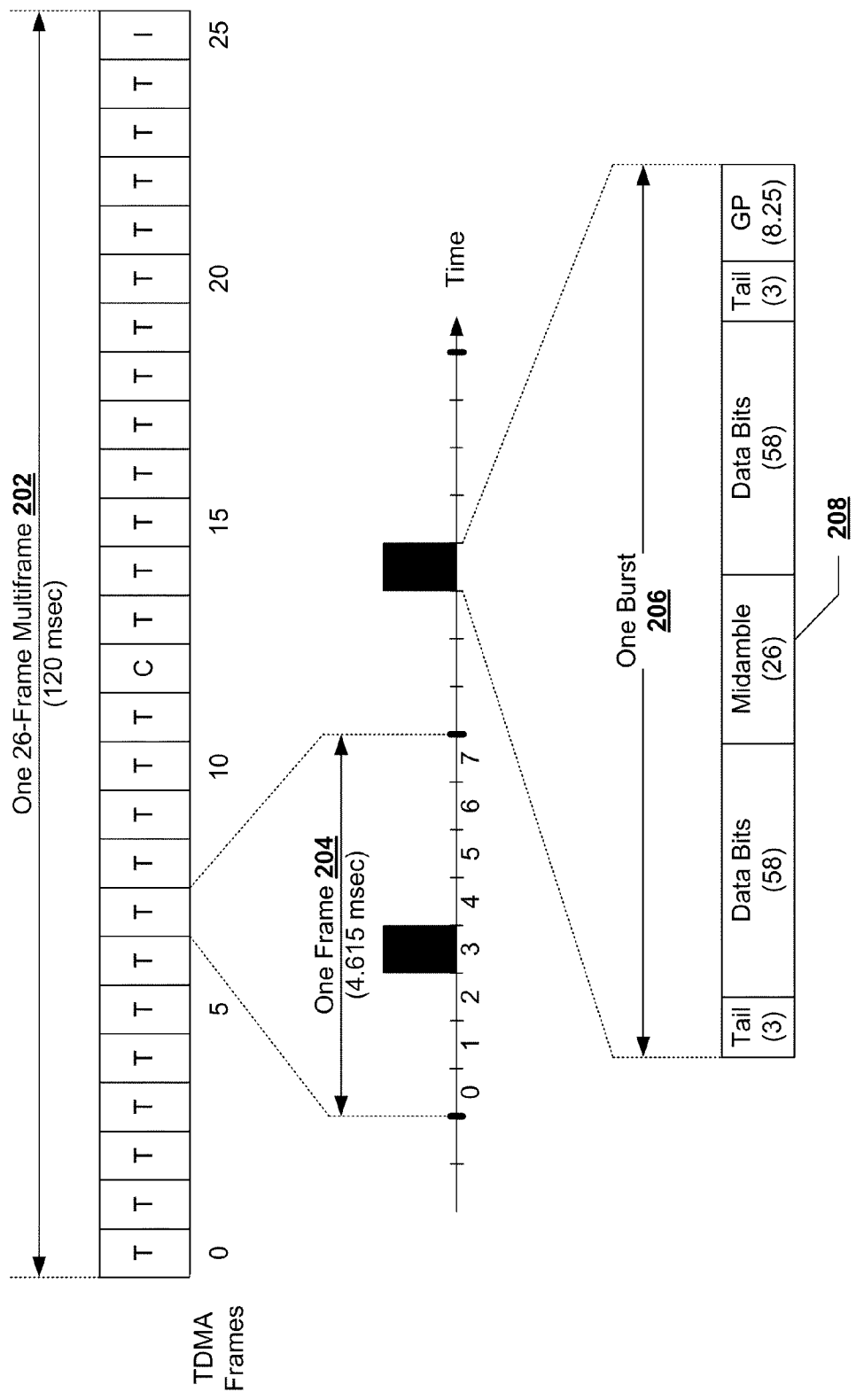
FIG. 2 is illustrates exemplary frame and burst formats in a GSM transmission, in accordance with certain configurations of the present disclosure.

FIG. 2 shows exemplary frame and burst formats in GSM. The timeline for downlink transmission is divided into multiframes. For traffic channels used to send user-specific data, each multiframe, such as exemplary multiframe 202, includes 26 TDMA frames, which are labeled as TDMA frames 0 through 25. The traffic channels are sent in TDMA frames 0 through 11 and TDMA frames 13 through 24 of each multiframe, as identified by the letter "T" in FIG. 2. A control channel, identified by the letter "C," is sent in TDMA frame 12. No data is sent in the idle TDMA frame 25 (identified by the letter "I"), which is used by the wireless devices to make measurements for neighbor base stations.

Each TDMA frame, such as exemplary TDMA frame 204, is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst, such as exemplary burst 206, includes two tail fields, two data fields, a training sequence (or midamble) field, and a guard period (GP). The number of bits in each field is shown inside the parentheses. GSM defines eight different training sequences that may be sent in the training sequence field. Each training sequence, such as midamble 208, contains 26 bits and is defined such that the first five bits are repeated and the second five bits are also repeated. Each training sequence is also defined such that the correlation of that sequence with a 16-bit truncated version of that sequence is equal to (a) sixteen for a time shift of zero, (b) zero for time shifts of ±1, ±2, ±3, ±4, and ±5, and (3) a zero or non-zero value for all other time shifts.

Figure 3:
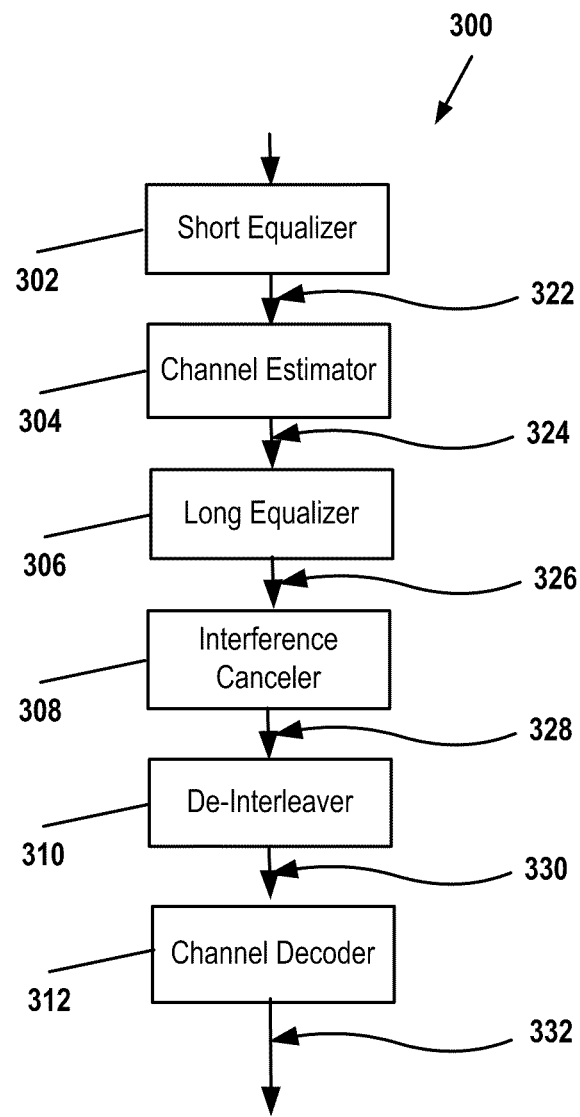
FIG. 3 is a block diagram of a portion of a receiver, in accordance with certain configurations of the present disclosure.

FIG. 3 is a block diagram of a receiver 300, in accordance with certain aspects of the present disclosure. The receiver 300 comprises a short equalizer section 302, a channel estimator section 304, a long equalizer section 306, interference canceller section 308, a de-interleaver section 310 and a channel decoder section 312.

The short equalizer section 302 is configured to generate a first equalized signal 322 (e.g., a first set of equalized symbols) by canceling CCI and ISI from a first portion of the received signal (e.g., a midamble or a preamble). The short equalizer section 302 also generates a first estimate of the channel (e.g., impulse response coefficients) on which the received burst of symbols was received. The short equalizer section 302 uses, for example, a blind channel estimation algorithm to obtain the first estimate of the channel and calculate a first set of equalized symbols. The short equalizer section 302 may initially operate upon a received signal corresponding to a short input sequence comprising a known signal (e.g., midamble) and iteratively process additional received signal samples, as further described below.

The channel estimator section 304 is configured to use the first estimate of the channel and the first equalized signal (input 322) to further estimate channel and further suppress ISI from the first set of equalized symbols and output a second equalized signal (output 324).

A long equalizer section 306 uses the second equalized signal 324 to further equalize the channel and suppress ISI and produce a first estimate of symbols in the received set of symbol (output 326). The long equalizer section 306 also produces a second estimate of the channel using the second equalized signal (also included in output 326).

An interference canceller section 308 uses the second estimate of the channel and the first estimate of symbols (collectively output 326) to refine the results to improve symbol decisions. The interference canceller section 308 produces hard symbol decisions and log-likelihood values associated with the symbol decisions (together shown as output 328). The symbols values from the output 328 are used by further receiver sections such as a de-interleaver 310 to generate data samples 330, which are further decoded by a channel decoder 312 to produce demodulated data 332.

Figure 4:
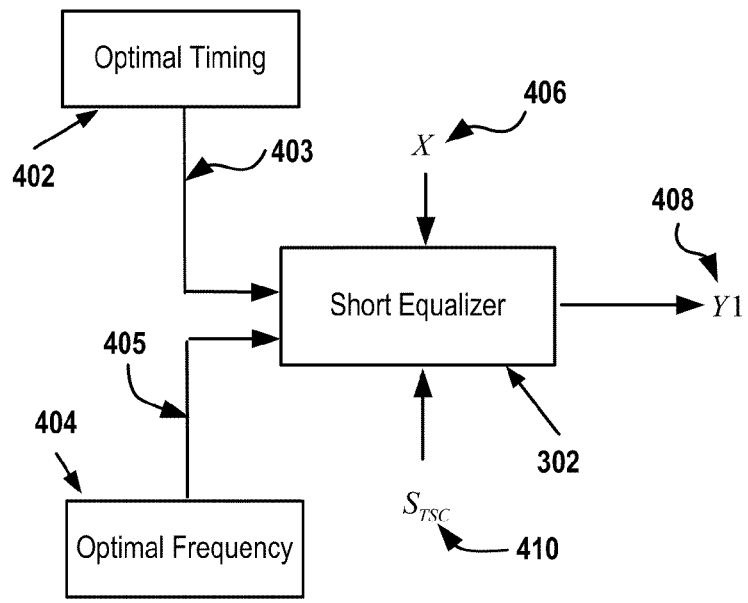
FIG. 4 is a block diagram of a short equalizer section, in accordance with certain configurations of the present disclosure.

FIG. 4 is a block diagram illustrating the operation of a short equalizer section 302, in accordance with certain configurations of the present disclosure. As depicted in FIG. 4, the optimal timing section 402 provides timing information 403 to the short equalizer section 302. Furthermore, the optimal frequency section 404 provides an estimate 405 of a carrier in the received signal to the short equalizer section 302. In certain configurations, the optimal frequency section 404 computes an optimal estimate 405 by evaluating an SNR value, as further described in details below. The short equalizer section 302 uses the optimal timing information 403 to minimize estimation error incurred during channel equalization calculations. For example, the timing information 403 is useful in deciding the start time and the duration of a time window comprising the first portion of the received signal (e.g., midamble). The short equalizer section 302 uses the frequency estimates 405 for recovering a carrier in the received signal. An optimal frequency estimate 405 helps improve performance of channel equalization by minimizing the estimation error. The short equalizer section 302 thus produces a first equalized signal output Y1 408 (substantially identical to output 322 of FIG. 3) from a set of input samples X 406, received from an earlier receiver section such as analog-to-digital converter (not shown in FIG. 4) and a set of symbols of known values $S_{TSC}$ 410 (e.g., a preamble or a midamble).

Still referring to FIG. 4, in certain configurations, the optimal timing and the optimal frequency calculations are performed sequentially. For example, first, an optimal timing estimate 403 is obtained by minimizing a target function (e.g., minimizing least squares error), by holding frequency offset to a constant value. Next, frequency estimate 405 is improved by holding the optimal timing estimate unchanged and calculating another target function (e.g., SNR) by changing the frequency offset. This process is iteratively repeated until no further improvements are achieved or until expiration of a time allocated for the calculation. For example, the SNR calculations is performed by changing frequency offset by one or more of {−200, −100, −50, 0, +50, +100, +200} Hz. One example error function for finding optimal timing is to minimize estimation error of a known set of symbols in the received signals. For example, in a GSM network, when the short equalizer 302 operates upon midamble section of the received signal, midamble estimation error is used as the error criterion for minimization during optimal timing estimation. In certain configurations, maximizing SNR is used as the error criterion for finding optimal frequency estimates 405.

The above-described optimal timing and optimal frequency recovery techniques are merely exemplary and several other optimization techniques well known in the art are possible. For example, previously referenced U.S. Patent Application No. 61/052,973 titled "TWO DIMENSIONAL SEARCH FOR GERAN: OPTIMAL TIMING AND CARRIER RECOVERY," incorporated herein by reference in its entirety, discloses various methods of timing and carrier recovery.

Figure 5:
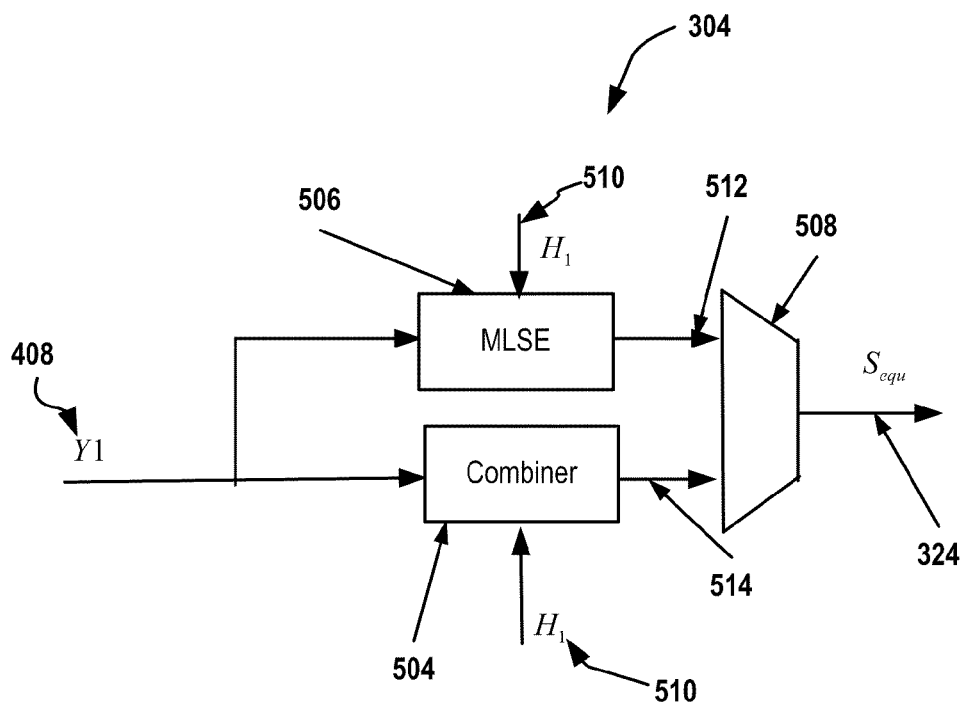
FIG. 5 is a block diagram of a channel estimator section, in accordance with certain configurations of the present disclosure.

FIG. 5 is a block diagram of the channel estimator section, in accordance with certain configurations of the present disclosure. The channel estimator section 304 receives an estimate of symbols Y1 408 from a previous signal processing section (e.g. the short equalizer section 302). The channel estimator section also receives an estimate $H_1$ 510 of the channel (e.g., from the short equalizer section 302). In certain configurations, the channel estimator section 304 is configured to use output of one of either an MLSE channel 506 (output 512) or a linear combiner (briefly called a combiner) 504 (output 514) to output equalized symbols. The multiplexer 508 selects either all the equalized symbols from the output 512 or all the equalized symbols from the output 514 to produce the equalized symbols $S_{equ}$ at the output 324. In certain configuration, only one of the MLSE section 506 and the combiner section 504 is operated on a given received signal. In certain other configurations, both the MLSE sections 506 and the combiner section 504 are operated simultaneously, and an appropriate output is selected by the multiplexer 508 to convey to the output 324.

The choice of operation of the MLSE section 506 and/or the combiner section 504 can be made in a variety of ways. For example, in certain configurations, the choice is fixed a priori, based on the modulation of signals received during operation of the receiver 102. For example, in certain configurations, MLSE section 506 is used only when the input signal comprises GMSK modulation and the input symbols have two possible values (e.g., 1-bit per symbol encoding), and the combiner section 504 is used when other (higher) constellation densities are received. In certain other configurations, the choice between sections 504 and 506 is made at run time. When calculations performed during channel estimation (e.g., at section) show that the received signal suffers from severe amplitude distortion, then MLSE section 506 is used, otherwise combiner section 504 is used. Such a run-time selection advantageously allows the receiver 102 to allocate computational resources to receive signals on an "as needed" basis, freeing up the computational resources for other tasks at the receiver 102.

The output 324 is used by the long equalizer section 306. In certain configurations, the operational principles of the long equalizer section 306 are similar to the operational principles of the short equalizer section 302 discussed before. The long equalizer section 306 computes a set of channel equalized output samples 326 using the equalized symbol set $S_{equ}$ 324 as the training sequence and the input samples X 406. In certain configurations, the long equalizer section 306 operates upon a training sequence having a larger number of samples compared to the short equalizer section 302. For example, in a GSM network, the long equalizer section 306 is operated on 142 samples, comprising 116 data samples and 26 midamble samples.

The interference canceller section 308 shown in FIG. 3 produces an output 328 comprising symbol decisions and log-likelihood values for the symbol decisions. Previously referenced co-pending U.S. patent application Ser. No. 12/553,855, titled "SYMBOL ESTIMATION METHODS AND APPARATUSES", incorporated herein by reference in its entirety, discloses certain configurations of operation of the interference canceller section 308 consistent with certain configurations of the present disclosure.

To describe certain configurations comprising various sections depicted in FIG. 3 in mathematical terms, the received signal samples of signal and interference (noise) can be written as below. For example, given a set of spatial and temporal samples at a time k:

$$\underline{x}_k = \begin{bmatrix} x_k(1) \\ x_k(2) \\ \vdots \\ x_k(M) \end{bmatrix}, \quad \underline{s}_k = \begin{bmatrix} s_k \\ s_{k-1} \\ \vdots \\ s_{k-\upsilon} \end{bmatrix} \quad (1a)$$

where $s_k$ is the midamble/quasi-midamble signal at time k, $\underline{s}_k$ is a $(\upsilon+1) \times 1$ midamble/quasi-midamble vector, and $\underline{x}_k$ is a $M \times 1$ received midamble/quasi-midamble vector, a set of spatial temporal samples can be defined as $$X_k = \begin{bmatrix} \underline{x}_k \\ \underline{x}_{k-1} \\ \vdots \\ \underline{x}_{k-L} \end{bmatrix}, \quad (1b),$$

where $X_k$ is a $M \times (L+1) \times 1$ vector of spatial temporal samples with a spatial length of M and a temporal length L+1, where M is the number of MIMO receive antennas on the receiver 102, L is the temporal stacking factor used to temporally stack received samples, $\upsilon$ is channel memory and P is the length of the midamble or quasi-midamble that represents the length of the burst signal being used in a given iteration, and wherein each of M, L, $\upsilon$ and P is a positive integer. The received signal samples can then be written as a function of convolution of the received symbols through a linear filter and an additive noise term as:

$$x_1(k) = h_1^T s(k) + g_1^T z(k) + n_1, \ x_2(k) = h_2^T s(k) + g_2^T z(k) + n_2, \quad (1c)$$

The task performed in the linear combiner 504 of the channel estimator section 304 can then be expressed as follows: estimate $s_k$ given $x_k$. Previously referenced U.S. application Ser. No. 12/038,724, titled "COHERENT SINGLE ANTENNA INTERFERENCE CANCELLATION FOR GSM/GPRS/EDGE," incorporated herein by reference in its entirety, discloses various techniques that may be utilized to perform such estimation.

In certain configurations, more samples are used for calculating results of channel equalization using MMSE, so that a full column rank for matrix inversion is obtained. In such configurations, the input signal samples are spatially and temporally stacked to obtain the following matrix:

$$\underline{X}_k = [\underline{x}^T(k), \underline{x}^T(k-1) \ldots \underline{x}^T(k-L)]^T \quad (2)$$

Accordingly, a spatial/temporal structured matrix can be constructed, such that $$[X] = [\underline{X}_k, \underline{X}_{k+1}, \ldots, \underline{X}_{k+P-\upsilon}], \quad (3)$$

where [X] is a M (L+1)×(P−υ) matrix. As an example, in a GSM network, P=26. Similar to the data matrix [X], temporal/spatial stacking for the symbols in the received signal gives the symbol matrix in equation (4).

$$[S]=[\underline{S}_k, \underline{S}_{k+1}, \ldots, \underline{S}_{s+P-\upsilon}], (\upsilon+1)\times(P-\upsilon) \quad (4)$$

As is well-known in the art, an interference suppression filter that can suppress interference can be expresses as:

$$W=[S][X]^T\{[X][X]^T\}^{-1}, (\nu+1)\times M(L+1) \quad (5)$$

Using the expression in equation (5) above, the output Y1 408 of the short equalizer section 302 shown in FIGS. 3 and 4 can be written as:

$$Y1=[W][X], (\nu+1)\times(P-\nu) \quad (6)$$

In certain configurations, the number of midamble samples used to estimate output Y1 408 may be increased from one iteration to the next, during the iterative process of channel equalization. For example, in certain configurations when the received signal is a GSM signal, the channel equalization calculations can start with using P=26, corresponding to the number of samples of midamble 208. In each subsequent iteration, more and more data bits can be included as the channel estimate improves. For example, in certain configurations, one additional sample from each side of the midamble 208 may be added to the symbol matrix [S] shown in equation (4).

Certain aspects of the channel estimator section 304 can be explained in mathematical terms as follows. The output of the short equalizer section 302 can be expressed in terms of an equivalent channel $$Y1=[H]_1[S], \quad (7)$$

In equation (7), $[H]_1$ is the equivalent channel estimate, with dimension $(\nu+1, \nu+1)$ and $[S]$ is the $(\nu+1, P-\nu)$ reference symbol matrix shown in equation (4). Generally speaking, output Y1 408 of the short equalizer 302 is a vector of streams of symbol values that has cancelled a significant amount of CCI, but a relatively smaller amount of ISI from the input signal X 406. The least-squares (LS) estimate of $[H]_1$ is as shown in equation (8) below. The channel estimator section 304 calculates the LS estimate $$[\hat{H}]_1=[Z][S]^H[SS^H]^{-1}. \quad (8)$$

As previously discussed, in certain configurations, the channel estimator section 304 calculates the LS estimate $[\hat{H}]_1$ using either a non-linear or a linear algorithm, decided either at run time or a priori. Certain aspects of the linear algorithm, implemented at the combiner 504, can be explained in mathematical terms as follows.

The output Y1 408 of the short equalizer 302, as described above, can also be represented as a matrix shown in equation (9) of estimated symbols to further explain the working of the combiner 504.

$$[Y1] = \begin{bmatrix} \hat{s}_\nu^0 & \hat{s}_{\nu+1}^0 & \hat{s}_{\nu+1}^0 & \hat{s}_{\nu+1}^0 & \cdots & \hat{s}_{N-1}^0 \\ \hat{s}_{\nu-1}^1 & \hat{s}_\nu^1 & \hat{s}_{\nu+1}^1 & \hat{s}_{\nu+2}^1 & \cdots & \hat{s}_{N-2}^1 \\ \vdots & \vdots & \vdots & \vdots & \vdots & \vdots \\ \hat{s}_0^\nu & \hat{s}_1^\nu & \cdots & \hat{s}_\nu^\nu & \cdots & \hat{s}_{N-1-\nu}^\nu \end{bmatrix} \quad (9)$$

It can be seen that the [Y1] matrix in equation (9) has a Toeplitz-like appearance, with an estimate symbol appearing in a row below, shifted one column to the right. For example, when the short equalizer 302 has equalized the channel to a large extent, the symbol $\hat{s}_\nu^0$ in the first row and first column has approximately the same value as the symbol $\hat{s}_\nu^1$ in the second row, second column, and so on. In certain configurations, when using the short equalizer 302 for equalizing GSM signals, the matrix [Y1] has dimension 5 rows×138 columns, corresponding to a 4-tap filter for channel equalization and using received signal samples comprising 116 data bits and 26 midamble symbols.

In the combiner 504 of FIG. 5, the symbol estimates are calculated as a weighted combination of the diagonal terms of [Y1] (terms that will be substantially identical to each other, due to the Toeplitz-structure, as explained above). For example, a linear combination of a symbol estimate can be expressed as:

$$\hat{s}_c(k) = \frac{1}{\nu+1}\sum_{i=0}^{\nu}\hat{s}_k^i \alpha_i, \quad \nu \le k \le N-1-\nu. \quad (10a)$$

In equation (10a) above, N represents the maximum burst length of the signal. For example, in a GSM network, N=138 (corresponding to 116 data samples plus 26 midamble samples minus 4, channel memory filter delay). The weighting factors are given as $$\alpha_i = \sum_{j=0}^{\nu}|\hat{H}_{i,j}|^2, \quad 0 \le i \le \nu \quad (10b)$$

It can be seen from equations (10a) and (10b) that symbol estimates are expressed as a linear combination of $(\nu+1)$ previously estimated symbols. For example, in a GSM network, the value ν may be chosen to be equal to 5. In such a network, a linear combination of 6 symbols is used to obtain a symbol estimate expressed in equation (10). The weighting factors given in equation (10b) estimate the energy in the impulse response of the estimated filter for each channel. Therefore, the weighting factors weigh the effect of each symbol in equation (10a) in proportion of the energy in the corresponding channel.

The output estimates obtained by solving equation (10a) are then hard-sliced to obtain hard estimates of symbols (first estimate of symbols), and provided as output 328 to the interference canceller 308.

The interference canceller section 308 is configured to operate on the first estimate of symbols from output 326 to generate a second estimate of symbols in the received signal based on, at least in part, a second estimate of the channel.

Figure 6:
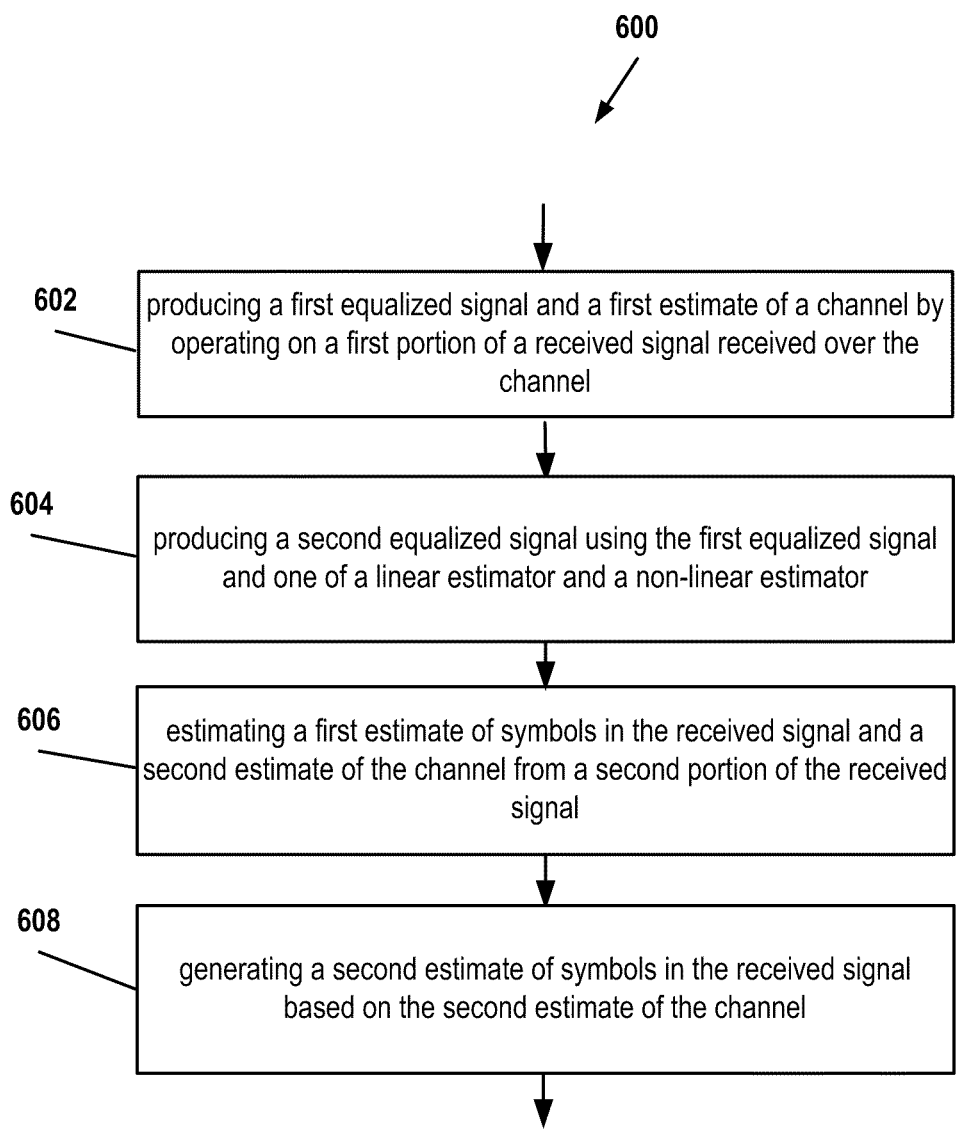
FIG. 6 is a flow chart of an exemplary decoding process, in accordance with certain configurations of the present disclosure.

FIG. 6 is a flow chart of an exemplary decoding process 600, in accordance with certain configurations of the present disclosure. The decoding process 600 produces demodulated data samples from an input signal received over a channel. In certain configurations, the decoding process 600 is implemented at a receiver 102. The decoding process 600 comprises the operation 602 of producing a first equalized signal and a first estimate of the channel by operating on a first portion of a received signal received over a channel. In certain configurations, the operation 602 is performed as previously discussed with respect to the short equalizer section 302. In such configurations, the first equalized signal is the signal Y1 408. Similarly, the first estimate of the channel is $H_1$ 510 and the first portion of the received signal comprises the midamble. The decoding process 600 further comprises the operation 604 of producing a second equalized signal using the first equalized signal and one of a linear estimator and a non-linear estimator. In certain configurations, the operation 604 is performed as previously discussed with respect to the channel estimator section 304. In such configurations, the second equalized signal is the output $S_{equ}$ 326. Furthermore, the linear estimator is the combiner section 504 and the non-linear estimator is the MLSE section 506. The decoding process 600 further comprises the operation 606 of estimating a first estimate of symbols in the received signal and a second estimate of the channel from a second portion of the received signal. In certain configurations, the operation 606 is performed as previously discussed with respect to the long equalizer section 306. The decoding process 600 further comprises the operation 608 of generating a second estimate of symbols in the received signal based on the second estimate of the channel. In certain configurations, the operation 608 is performed as previously discussed with respect to the interference canceller section 308.

Figures 7A, 7B:
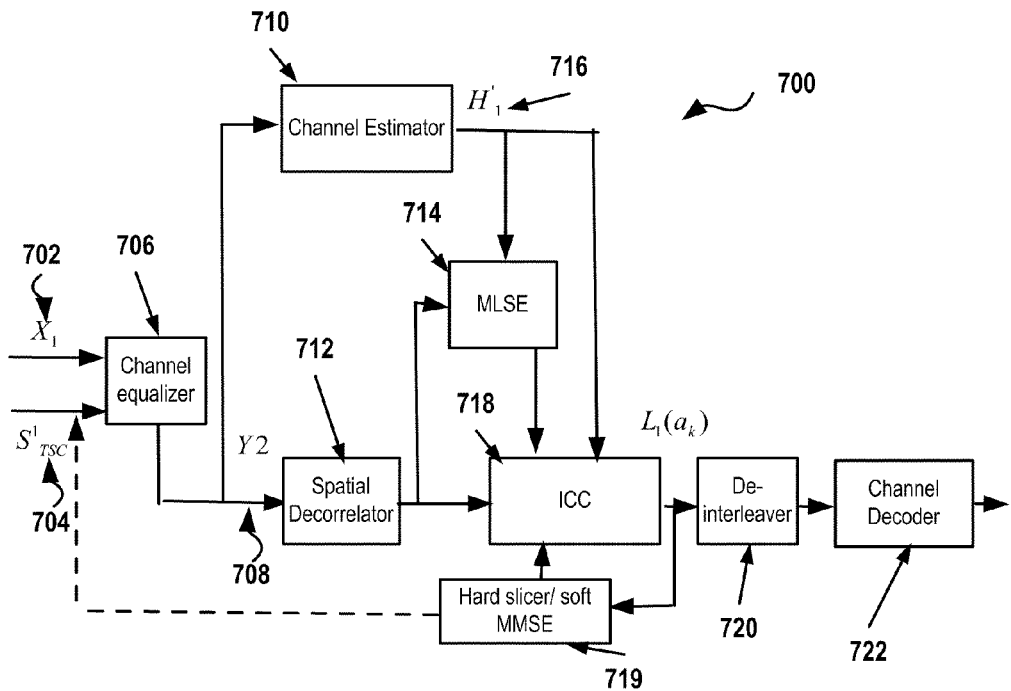
FIG. 7a is a block diagram illustrating a receiver in accordance with certain configurations of the present disclosure.
FIG. 7b is a block diagram illustrating a receiver in accordance with certain other configurations of the present disclosure.

FIG. 7a is a block diagram illustrating a receiver 700 in accordance with certain configurations of the present invention. In the illustrated embodiment, symbol decision feedback is used from symbol decisions made in the ICC section 718 to a channel equalizer section 706 to successively improve interference suppression. In certain configuration, the use of feedback to iteratively improve channel suppression lends itself to an implementation in which a channel equalizer begins an iterative symbol detection process as a "short" equalizer and progressively becomes a "longer" channel equalizer in successive iterations. In other words, a channel equalizer section operates as a short equalizer (on a smaller number of input samples) at the onset of the iterative process, and operates as a long equalizer (on a higher number of input samples compared to the first iteration) in the final iteration.

As seen in FIG. 7a, samples of a received signal $X_1$ 702 and a set of known symbols $S^1_{TSC}$ 704 are input to a channel equalizer section 706. In certain configurations, the received signal $X_1$ 702 is identical to the received signal X 406, the set of known symbols $S^1_{TSC}$ 704 is identical to $S_{TSC}$ 410 of FIG. 4 and the channel equalizer 706 is identical to the short equalizer 302 of FIG. 3. The channel equalizer section 706 outputs a first equalized signal Y2 708 and a first estimate of the channel. In certain configurations the first equalized signal Y2 708 is identical to Y1 408 of FIG. 4. A channel estimator section 710 produces a second estimate of the channel $H'_1$ 716 and a first estimate of symbols. In certain configurations, the channel estimator section 710 is identical to the long equalizer section 306 of FIG. 3 and the second estimate of the channel $H'_1$ 716 is identical to $H_1$ 510 of FIG. 5. The MLSE section 714 receives the first equalized signal Y2 708, after it has been re-arranged in a spatially decorrelated form in a spatial decorrelator section 712, to produce a second equalized signal input to the interference canceller section 718. In certain configurations, the MLSE section 714 is identical to the MLSE section 506 of FIG. 5, and the first equalized signal Y2 708 is identical to Y1 408 of FIGS. 4 and 5. The operational principles of a spatial decorrelator section 712 are well-known in the art.

Still referring to FIG. 7a, the interference canceller section 718 uses the first estimate of symbols and a channel estimate from the channel estimator section 710 to generate a second estimate of symbols and a log-likelihood value associated with the second symbol estimates. In certain configurations, the interference canceller section 718 is identical to the interference canceller section 308 of FIG. 3. The channel estimate may be iteratively refined using a minimum mean square errors (MMSE) symbol estimation section 719 that uses a hard slicer and a soft MMSE symbol decision algorithm to produce refined estimates of symbols that are further used by the channel equalizer section 706 in the next iteration. An iteration termination criterion such as mean square error improvement from one iteration to the next, or expiration of a timing budget to calculate symbol estimate, may be used in terminating the iterative estimation process. Previously referenced U.S. patent application Ser. No. 12/553,855 titled "SYMBOL ESTIMATION METHODS AND APPARATUSES" describes certain iterative techniques to refine symbol estimates. A de-interleaver section 720 de-interleaves symbols from the second estimate of symbols. In certain configurations, the de-interleaver section 720 is identical to the de-interleaver section 310 of FIG. 3. A channel decoder section 722 uses the de-interleaved symbols to produce data output. In certain configurations, the channel decoder section 722 is identical to the channel decoder section 312 of FIG. 3.

FIG. 7b is a block diagram illustrating a receiver 790 in accordance with certain other configurations of the present invention. In the illustrated embodiment, symbol decision feedback is used from a symbol decision section to a channel equalizer section to successively improve interference suppression. In certain configuration, the use of feedback to iteratively improve channel suppression lends itself to an implementation in which a channel equalizer begins an iterative symbol detection process as a "short" equalizer and progressively becomes a "longer" channel equalizer in successive iterations. In other words, a channel equalizer section operates as a short equalizer (on a smaller number of input samples) at the onset of the iterative process, and operates as a long equalizer (on a higher number of input samples compared to the first iteration) in the final iteration.

As seen in FIG. 7b, samples of a received signal $X_2$ 750 and a set of symbols $S^2_{dec}$ 752 are input to a channel equalizer section 754. In certain configurations, in the first iteration, the set of symbols $S_{dec}$ 752 is equal to the set of symbols $S^1_{TSC}$ 704 of FIG. 7a. The channel equalizer section 754 outputs a first equalized signal Y3 756 and a first estimate of the channel. In certain configurations, the channel equalizer section 754 is identical to the short equalizer section 302 of FIG. 3 and the first equalized signal Y3 756 is identical to Y1 408 of FIGS. 4 and 5. A channel estimator section 758 produces a second estimate of the channel $H''_1$ 764 and a first estimate of symbols. In certain configurations, the channel estimator section 758 is identical to the long equalizer section 306 of FIG. 3 and the second estimate of the channel $H''_1$ 764 is identical to $H_1$ 510 of FIG. 5. A combiner section 762 receives the first equalized signal Y3 756, aligned for ease of calculations in a stream alignment section 760, to produce a second equalized signal input to the interference canceller section 766.

Still referring to FIG. 7b, the stream alignment section 760 operates to implement the mathematical operations described with respect to equation (9) above. The interference canceller section 766 uses the first estimate of symbols and the second estimate of the channel to generate a second estimate of symbols and a log-likelihood value associated with the second symbol estimates. In certain configurations, the combiner section 762 is identical to the combiner section 504 of FIG. 5 and the interference canceller section 766 is identical to the interference canceller section 308 of FIG. 3. The channel estimate may be iteratively refined using a minimum mean square errors (MMSE) symbol estimation section 768 that uses a hard slicer and a soft MMSE symbol decision algorithm to produce refined estimates of symbols that are further used by the channel equalizer section 754 in the next iteration. An iteration termination criterion such as mean square error improvement from one iteration to the next, or expiration of a timing budget to calculate symbol estimate, may be used in terminating the iterative estimation process. Previously referenced U.S. patent application, titled "SYMBOL ESTIMATION METHODS AND APPARATUSES" (Attorney Docket No. 091495) describes certain iterative techniques to refine symbol estimates. A de-interleaver section 770 de-interleaves symbols from the second estimate of symbols. In certain configurations, the de-interleaver section 770 is identical to the de-interleaver section 310 of FIG. 3. A channel decoder section 772 uses the de-interleaved symbols to produce data output. In certain configurations, the channel decoder section 772 is identical to the channel decoder section 312 of FIG. 3.

Figure 8:
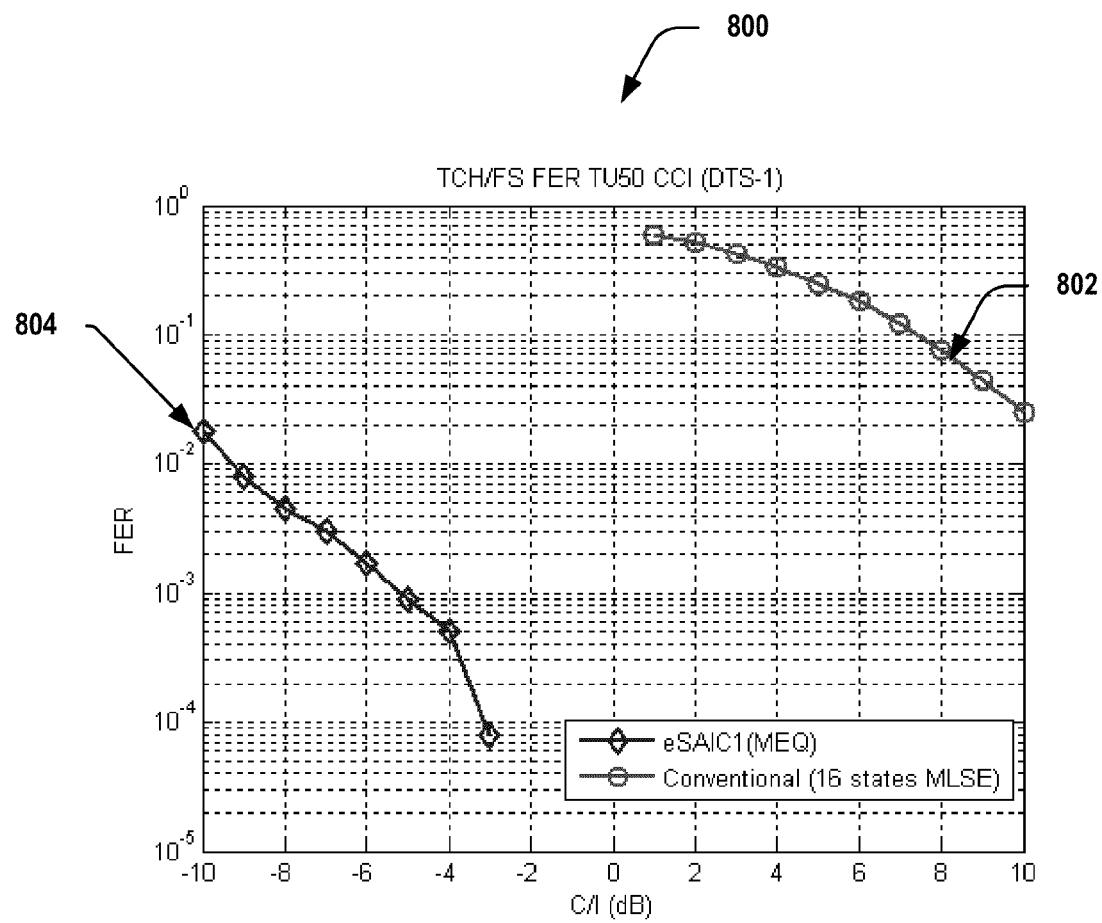
FIG. 8 is a chart illustrating frame error rate performance improvements achievable utilizing certain aspects of the subject technology, in accordance with certain configurations of the present disclosure.

FIG. 8 is a chart 800 illustrating exemplary performance achievable in accordance with certain configurations of the subject technology. Chart 800 depicts the frame error rate over a range of carrier energy to interference energy ratios (C/I) for exemplary receiver systems operating on GSM TU50 communication channel. As can be seen in chart 800, performance using a linear combiner 504 discussed above, shown as curve 804 (labeled "eSAIC/MEQ"), improves significantly over performance depicted by curve 802 using a conventional 16-state MLSE channel estimator.

Figure 9:
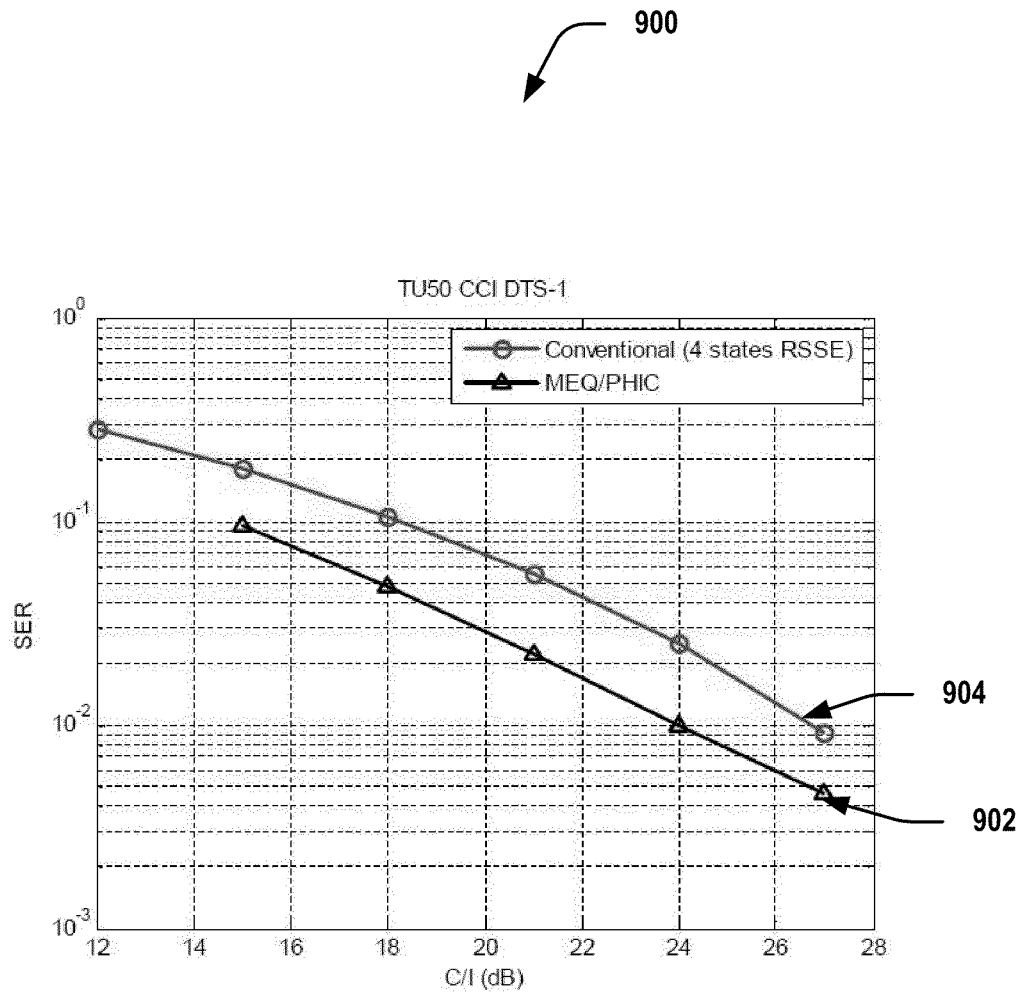
FIG. 9 is a chart illustrating symbol error rate performance improvements achievable utilizing certain aspects of the subject technology, in accordance with certain configurations of the present disclosure.

FIG. 9 is a chart 900 illustrating exemplary performance achievable in accordance with certain configurations of the subject technology. Chart 900 depicts the symbol error rate over a range of carrier energy to interference energy ratios (Eb/No) for exemplary receiver systems operating on an EDGE HT100 communication channel, using 8PSK modulation and having CCI. As can be seen in chart 900, the curve 902 represents performance using certain aspects of the present disclosure (labeled "MEQ/PHIL") and is seen to improve by over 2 dB compared to performance using a conventional 4-state RSSE channel equalization technique depicted by curve 904.

Figure 10:
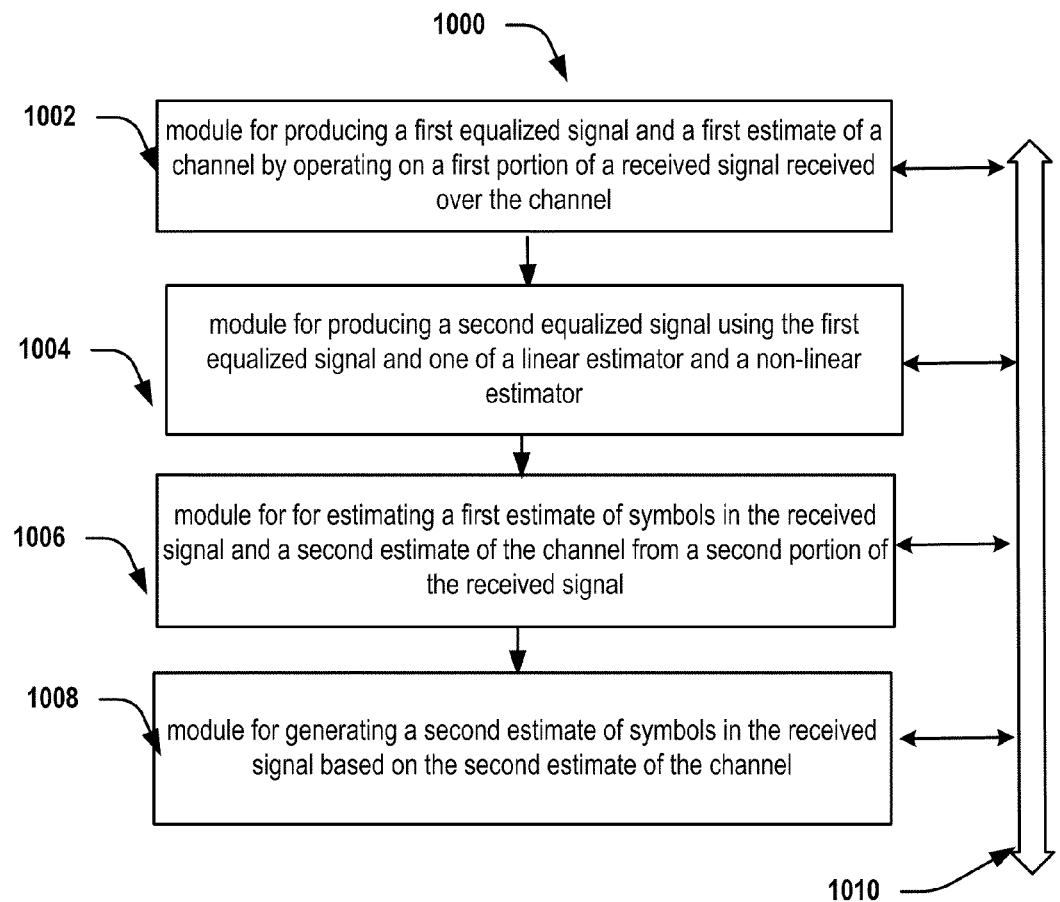
FIG. 10 is a block diagram illustrating an apparatus with which certain aspects of the subject technology may be implemented in accordance with certain configurations of the present disclosure.

FIG. 10 is a block diagram that illustrates exemplary apparatus 1000 in accordance with certain configurations of the present disclosure. The receiver apparatus 1000 comprises means 1002 for producing a first equalized signal and a first estimate of a channel by operating on a first portion of a received signal received over a channel, means 1004 for producing a second equalized signal using the first equalized signal and one of a linear estimator and a non-linear estimator, means 1006 for estimating a first estimate of symbols in the received signal and a second estimate of channel from a second portion of the received signal and means 1008 for generating a second estimate of symbols in the received signal, based on the second estimate of the channel. As depicted in FIG. 10, means 1002, 1004, 1006 and 1008 are in communication with each other via a communication means 1010.

Figure 11:
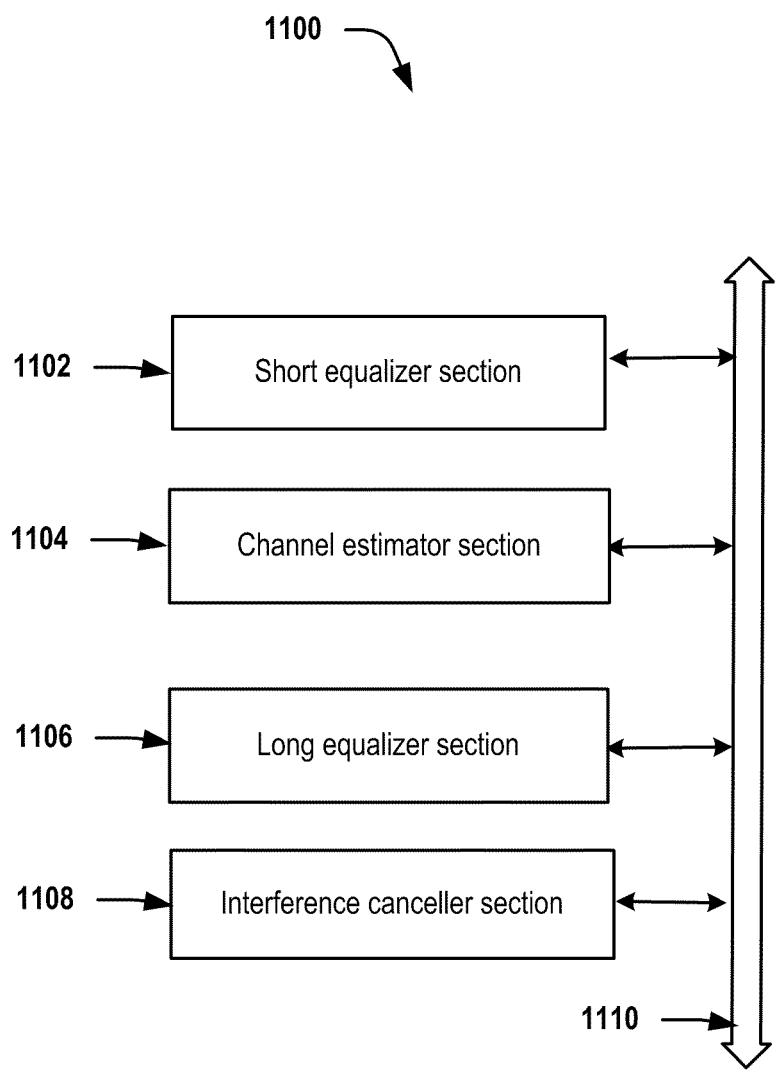
FIG. 11 is a block diagram illustrating an apparatus with which certain aspects of the subject technology may be implemented in accordance with certain configurations of the present disclosure.

FIG. 11 is a block diagram that illustrates exemplary receiver system 1100 in accordance with certain configurations of the subject technology. The receiver system 1100 comprises a short equalizer section 1102 configured to produce a first equalized signal and a first estimate of a channel by operating on a first portion of a received signal received over a channel, a channel estimator section 1104 configured to produce a second equalized signal using the first equalized signal and one of a linear estimator and a non-linear estimator, a long equalizer section 1106 configured to estimate a first estimate of symbols in the received signal and a second estimate of channel from a second portion of the received signal and an interference canceller section 1108 configured to generate a second estimate of symbols in the received signal, based on the second estimate of the channel. As depicted in FIG. 11, the modules 1102, 1104, 1106 and 1108 are in communication via a communication module 1110.

Figure 12:
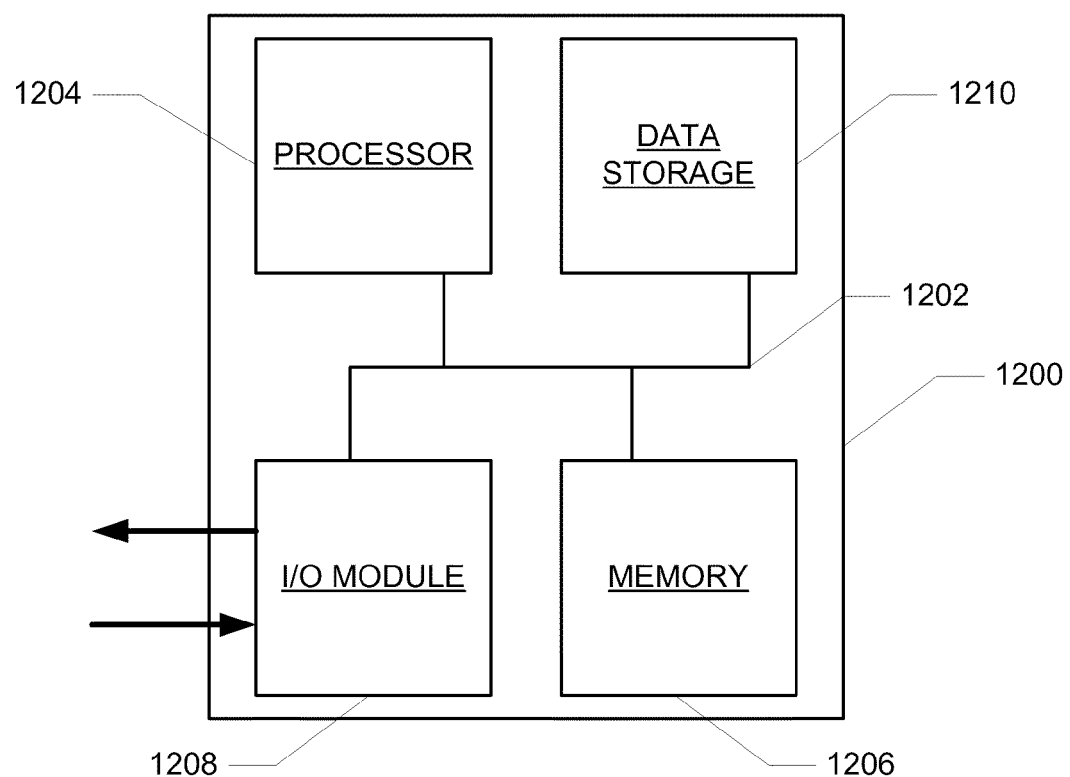
FIG. 12 is a block diagram illustrating a computer system with which certain aspects of the subject technology may be implemented in accordance with certain configurations of the present disclosure.

FIG. 12 is a block diagram that illustrates a computer system 1200 upon which an aspect may be implemented. Computer system 1200 includes a bus 1202 or other communication mechanism for communicating information, and a processor 1204 coupled with bus 1202 for processing information. Computer system 1200 also includes a memory 1206, such as a random access memory ("RAM") or other dynamic storage device, coupled to bus 1202 for storing information and instructions to be executed by processor 1204. Memory 1206 can also be used for storing temporary variable or other intermediate information during execution of instructions to be executed by processor 1204. Computer system 1200 further includes a data storage device 1210, such as a magnetic disk or optical disk, coupled to bus 1202 for storing information and instructions.

Computer system 1200 may be coupled via I/O module 1208 to a display device (not illustrated), such as a cathode ray tube ("CRT") or liquid crystal display ("LCD") for displaying information to a computer user. An input device, such as, for example, a keyboard or a mouse may also be coupled to computer system 1200 via I/O module 1208 for communicating information and command selections to processor 1204.

According to one aspect, interference suppression is performed by a computer system 1200 in response to processor 1204 executing one or more sequences of one or more instructions contained in memory 1206. Such instructions may be read into memory 1206 from another machine-readable medium, such as data storage device 1210. Execution of the sequences of instructions contained in main memory 1206 causes processor 1204 to perform the process steps described herein. One or more processors in a multi-processing arrangement may also be employed to execute the sequences of instructions contained in memory 1206. In alternative aspects, hard-wired circuitry may be used in place of or in combination with software instructions to implement various aspects. Thus, aspects are not limited to any specific combination of hardware circuitry and software.

The term "machine-readable medium" as used herein refers to any medium that participates in providing instructions to processor 1204 for execution. Such a medium may take many forms, including, but not limited to, non-volatile media, volatile media, and transmission media. Non-volatile media include, for example, optical or magnetic disks, such as data storage device 1210. Volatile media include dynamic memory, such as memory 1206. Transmission media include coaxial cables, copper wire, and fiber optics, including the wires that comprise bus 1202. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative sections, blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

What is claimed is:

1. A communication receiver comprising:
    a short equalizer section configured to operate on a first portion of a received signal received over a channel to produce a first equalized signal and a first estimate of the channel;
    a channel estimator section configured to operate on the first equalized signal to produce a second equalized signal, the channel estimator section comprising a linear estimator and a non-linear estimator;
    a long equalizer section configured to operate on a second portion of the received signal to produce a first estimate of symbols in the received signal and a second estimate of the channel;
    an interference canceller section configured to operate on the first estimate of symbols in the received signal to generate a second estimate of symbols in the received signal based on, at least in part, the second estimate of the channel;
    an optimal timing section configured to extract timing information from the received signal; and
    an optimal frequency section configured to generate an estimate of a carrier frequency from the received signal.

2. The communication receiver of claim 1, wherein the channel estimator section further comprises a stream alignment section configured to align samples of the first equalized signals for processing by the linear estimator.

3. The communication receiver of claim 1, further comprising:
    a de-interleaver section configured to de-interleave symbols from the second estimate of symbols to produce a symbol sequence, and
    a channel decoder section configured to generate received data from the symbol sequence.

4. The communication receiver of claim 1, wherein the channel estimator is further configured to use one of the linear estimator or the non-linear estimator in response to a modulation type of the received signal.

5. The communication receiver of claim 4, wherein the channel estimator does not use the non-linear estimator if the modulation type of the received signal comprises more than one bit per symbol.

6. The communication receiver of claim 1, wherein the first portion of the received signal comprises a known signal.

7. The communication receiver of claim 6, wherein the known signal comprises a midamble.

8. The communication receiver of claim 1, wherein the second equalized signal comprises a midamble portion and a data burst portion.

9. The communication receiver of claim 1, wherein the short equalizer section is further configured to use the estimate of the carrier frequency and the timing information to minimize an estimation error incurred in producing the first equalized signal and the first estimate of the channel.

10. The communication receiver of claim 1, wherein the short equalizer section is further configured to produce the first equalized signal using a blind estimation algorithm.

11. The communication receiver of claim 1, wherein the linear estimator is configured to produce the second equalized signal by weighing symbols in the first equalized signal by a measure of energy in the first estimate of the channel.

12. The communication receiver of claim 1, further comprising a minimum mean squared error (MMSE) symbol estimation section configured to provide symbol estimates to the short equalizer section and wherein the channel estimator section is configured to produce the second equalized signal using the linear estimator.

13. A signal reception method comprising:
    producing a first equalized signal and a first estimate of a channel by operating on a first portion of a received signal received over the channel;
    producing a second equalized signal using the first equalized signal and one of a linear estimator and a non-linear estimator;
    estimating a first estimate of symbols in the received signal and a second estimate of the channel from a second portion of the received signal;
    generating a second estimate of symbols in the received signal based on the second estimate of the channel;
    extracting timing information from the received signal; and
    generating an estimate of a carrier frequency from the received signal.

14. The signal reception method of claim 13, further comprising:
    aligning samples of the first equalized signals for processing by the linear estimator.

15. The signal reception method of claim 13, further comprising:
    de-interleaving symbols from the second estimate of symbols to produce a symbol sequence, and
    generating received data from the symbol sequence.

16. The signal reception method of claim 13, wherein the operation of producing the second equalized signal further comprises:

selectively using one of the linear estimator or the non-linear estimator in response to a modulation type of the received signal.

17. The signal reception method of claim 13, wherein the operation of producing the second equalized signal does not use the non-linear estimator when the modulation type of the received signal comprises more than one bit per symbol.

18. The signal reception method of claim 13, wherein the first portion of the received signal comprises a known signal.

19. The signal reception method of claim 18, wherein the known signal comprises a midamble.

20. The signal reception method of claim 13, wherein the second equalized signal comprises a midamble portion and a data burst portion.

21. The signal reception method of claim 13, wherein the operation of producing the first equalized signal further comprises using the estimate of the carrier frequency and the timing information to minimize an estimation error incurred in producing the first equalized signal and the first estimate of the channel.

22. The signal reception method of claim 13, wherein the operation of producing the first equalized signal further comprises producing the first equalized signal using a blind estimation algorithm.

23. The signal reception method of claim 13, wherein the operation of producing the second equalized signal further comprises producing the second equalized signal by weighing symbols in the first equalized signal by a measure of energy in the first estimate of the channel.

24. The signal reception method of claim 13, further comprising:
iteratively using, until an iteration termination criterion is met, the second estimate of symbols in the operation of producing the first equalized channel by increasing a number of samples in the first portion of the received signal in each successive iteration and wherein the operation of producing the second equalized signal is performed using the linear estimator.

25. A non-transitory machine-readable medium comprising instructions for receiving a signal at a receiver, the instructions comprising:
code for producing a first equalized signal and a first estimate of a channel by operating on a first portion of a received signal received over the channel;
code for producing a second equalized signal using the first equalized signal and one of a linear estimator and a non-linear estimator;
code for estimating a first estimate of symbols in the received signal and a second estimate of the channel from a second portion of the received signal;
code for generating a second estimate of symbols in the received signal based on the second estimate of the channel;
code for extracting timing information from the received signal; and
code for generating an estimate of a carrier frequency from the received signal.

26. The non-transitory machine-readable medium of claim 25, wherein the instructions further comprise:
code for aligning samples of the first equalized signals for processing by the linear estimator.

27. The non-transitory machine-readable medium of claim 25, wherein the instructions further comprise:
code for de-interleaving symbols from the second estimate of symbols to produce a symbol sequence, and
code for generating received data from the symbol sequence.

28. The non-transitory machine-readable medium of claim 25, wherein the code for producing the second equalized signal further comprises:
code for selectively using one of the linear estimator or the non-linear estimator in response to a modulation type of the received signal.

29. The non-transitory machine-readable medium of claim 25, wherein the code for producing the second equalized signal does not disable the use of the non-linear estimator if the modulation type of the received signal comprises more than one bit per symbol.

30. The non-transitory machine-readable medium of claim 25, wherein the first portion of the received signal comprises a known signal.

31. The non-transitory machine-readable medium of claim 30, wherein the known signal comprises a midamble.

32. The non-transitory machine-readable medium of claim 25, wherein the second equalized signal comprises a midamble portion and a data burst portion.

33. The non-transitory machine-readable medium of claim 25, wherein the code for producing the first equalized signal further comprises code for using the estimate of the carrier frequency and the timing information to minimize an estimation error incurred in producing the first equalized signal and the first estimate of the channel.

34. The non-transitory machine-readable medium of claim 25, wherein the code for producing the first equalized signal further comprises code for producing the first equalized signal using a blind estimation algorithm.

35. The non-transitory machine-readable medium of claim 25, wherein the code for producing the second equalized signal further comprises code for producing the second equalized signal by weighing symbols in the first equalized signal by a measure of energy in the first estimate of the channel.

36. The non-transitory machine-readable medium of claim 25, wherein the instructions further comprise:
code for iteratively using, until an iteration termination criterion is met, the second estimate of symbols in the operation of producing the first equalized channel by increasing a number of samples in the first portion of the received signal in each successive iteration and wherein the operation of producing the second equalized signal is performed using the linear estimator.

37. A signal reception apparatus comprising:
means for producing a first equalized signal and a first estimate of a channel by operating on a first portion of a received signal received over the channel;
means for producing a second equalized signal using the first equalized signal and one of a linear estimator and a non-linear estimator;
means for estimating a first estimate of symbols in the received signal and a second estimate of the channel from a second portion of the received signal;
means for generating a second estimate of symbols in the received signal based on the second estimate of the channel;
means for extracting timing information from the received signal; and
means for generating an estimate of a carrier frequency from the received signal.

38. The signal reception apparatus of claim 37, further comprising:
means for aligning samples of the first equalized signals for processing by the linear estimator.

39. The signal reception apparatus of claim 37, further comprising:
means for de-interleaving symbols from the second estimate of symbols to produce a symbol sequence, and
means for generating received data from the symbol sequence.

40. The signal reception apparatus of claim 37, wherein the means for producing the second equalized signal further comprises:
means for selectively using one of the linear estimator or the non-linear estimator in response to a modulation type of the received signal.

41. The signal reception apparatus of claim 37, wherein the means for producing the second equalized signal does not use the non-linear estimator if the modulation type of the received signal comprises more than one bit per symbol.

42. The signal reception apparatus of claim 37, wherein the first portion of the received signal comprises a known signal.

43. The signal reception apparatus of claim 42, wherein the known signal comprises a midamble.

44. The signal reception apparatus of claim 37, wherein the second equalized signal comprises a midamble portion and a data burst portion.

45. The signal reception apparatus of claim 37, wherein the means for producing the first equalized signal further comprises means for using the estimate of the carrier frequency and the timing information to minimize an estimation error incurred in producing the first equalized signal and the first estimate of the channel.

46. The signal reception apparatus of claim 37, wherein the means for producing the first equalized signal further comprises means for producing the first equalized signal using a blind estimation algorithm.

47. The signal reception apparatus of claim 37, wherein the means for producing the second equalized signal further comprises means for producing the second equalized signal by weighing symbols in the first equalized signal by a measure of energy in the first estimate of the channel.

48. The signal reception apparatus of claim 37, further comprising:
means for iteratively using, until an iteration termination criterion is met, the second estimate of symbols in the operation of producing the first equalized channel by increasing a number of samples in the first portion of the received signal in each successive iteration and wherein the means for producing the second equalized signal comprises means for performing equalization using the linear estimator.

49. A communication device comprising:
a memory; and
a processor configured to execute instructions to:
produce a first equalized signal and a first estimate of a channel by operating on a first portion of a received signal received over the channel;
produce a second equalized signal using the first equalized signal and one of a linear estimator and a non-linear estimator;
estimate a first estimate of symbols in the received signal and a second estimate of the channel from a second portion of the received signal;
generate a second estimate of symbols in the received signal based on the second estimate of the channel;
extract timing information from the received signal; and
generate an estimate of a carrier frequency from the received signal.

50. The communication device of claim 49, wherein the processor is further configured to execute instructions to:
align samples of the first equalized signals for processing by the linear estimator.

51. The communication device of claim 49, wherein the processor is further configured to execute instructions to:
de-interleave symbols from the second estimate of symbols to produce a symbol sequence, and
generate received data from the symbol sequence.

52. The communication device of claim 49, wherein the processor is further configured to execute instructions to:
selectively use one of the linear estimator or the non-linear estimator in response to a modulation type of the received signal.

53. The communication device of claim 49, wherein the instructions to produce the second equalized signal do not include instructions to disable the use of the non-linear estimator if the modulation type of the received signal comprises more than one bit per symbol.

54. The communication device of claim 49, wherein the first portion of the received signal comprises a known signal.

55. The communication device of claim 54, wherein the known signal comprises a midamble.

56. The communication device of claim 49, wherein the second equalized signal comprises a midamble portion and a data burst portion.

57. The communication device of claim 49, wherein the instructions to produce the first equalized signal further comprise instructions to use the estimate of the carrier frequency and the timing information to minimize an estimation error incurred in producing the first equalized signal and the first estimate of the channel.

58. The communication device of claim 49, wherein the instructions to produce the first equalized signal further comprise instructions to produce the first equalized signal using a blind estimation algorithm.

59. The communication device of claim 49, wherein the instructions to produce the second equalized signal further comprise instructions to produce the second equalized signal by weighing symbols in the first equalized signal by a measure of energy in the first estimate of the channel.

60. The communication device of claim 49, wherein the processor is further configured to execute instructions to:
iteratively use, until an iteration termination criterion is met, the second estimate of symbols to produce the first equalized channel by increasing a number of samples in the first portion of the received signal in each successive iteration and wherein the instructions to produce the second equalized signal comprise instructions to produce the second equalized signal using the linear estimator.

* * * * *